United States Patent [19]

Orazi

[11] Patent Number: 5,063,283

[45] Date of Patent: Nov. 5, 1991

[54] BATHROOM CABINET

[76] Inventor: William Orazi, 950 Colorado Ave. #6, Stuart, Fla. 33494

[21] Appl. No.: 490,353

[22] Filed: Mar. 8, 1990

[51] Int. Cl.⁵ ............................................. H05B 3/64
[52] U.S. Cl. .................................... 219/218; 219/219
[58] Field of Search ............... 219/218, 219, 220, 213, 219/522; 392/347, 360, 356, 363, 370, 371; 350/582, 588

[56] References Cited

U.S. PATENT DOCUMENTS 2,171,662  9/1939  Marchand ........................... 392/363
3,839,620  10/1974  Seibel et al. ........................ 219/219
4,701,594  10/1987  Powell ................................ 219/219

Primary Examiner—Teresa J. Walberg
Assistant Examiner—Tuan Vinh To
Attorney, Agent, or Firm—Terry M. Gernstein

[57] ABSTRACT

A bathroom cabinet includes a main mirror that is kept defogged by directing heated air thereagainst. The amount of air and the temperature of that air is controlled according to the temperature and relative humidity in the room. A lighting assembly is also included in the cabinet.

9 Claims, 4 Drawing Sheets

BATHROOM CABINET

TECHNICAL FIELD OF THE INVENTION

The present invention relates to the general art of cabinets, and to the particular field of bathroom medicine cabinets.

BACKGROUND OF THE INVENTION

Many people require the use of a bathroom mirror after they have showered. Examples of the uses to which such mirrors have been placed include shaving, coming hair, putting on makeup and the like. However, such mirrors almost always become fog-covered, and simply wiping the mirror does not prevent water from continuing to condense on the mirror, thereby inhibiting, if not completely preventing, use of the mirror.

Accordingly, the art has included several antifogging designs that are intended to eliminate the formation of condensation on a bathroom mirror. These design proposals generally include a fan unit that is attached to the mirror to blow hot air across the mirror. The fan unit can be a hand-held hair dryer type device.

However, these proposals have been constructed in a manner whereby the unattractive appearance, unconventional design and loudness of the working units rendered them impractical for the common market and thus inhibit their commercial acceptance.

Many of these proposals are designed mostly for addition to an existing mirror, and are thus insufficient as installation is complicated, costly and, at times, due to the design of certain units, electrical cords are left dangling over the viewing surface of the mirror. Such exposed electrical cords in a bathroom may be undesirable.

Additionally, the air exhausted from these units is directed in a manner that does not adequately cover the entire surface of the mirror, or at least that portion of the surface that is most likely to be fog covered. Still further, these prior devices do not always have the ability to match the needs of a particular condition, and may leave most of a mirror surface fogged, or at least that portion of the mirror surface which is most needed.

Still further, these devices are not completely efficient in operation and thus either move too much air across the mirror or too little according to the requirements of the particular conditions existing in the bathroom when someone seeks to use the mirror. Furthermore, many of these prior devices do not have the capability of directing heated air only to those area of the mirror which ar most likely to require defogging, and thus are often wasteful of energy.

Therefore, there is a need for a bathroom mirror that has anti-fogging capabilities which are efficient and which can be adjusted to meet the precise requirements of the conditions existing in the room at the time the mirror is being used whereby the exact amount of heated air which is heated to the precise temperature necessary is used on the exact locations most effective in removing and preventing fog buildup on that mirror.

OBJECTS OF THE INVENTION

It is a main object of the present invention is to provide a bathroom mirror that has anti-fogging capabilities.

It is another object of the present invention is to provide a bathroom mirror that has anti-fogging capabilities which are efficient.

It is another object of the present invention is to provide a bathroom mirror that has anti-fogging capabilities which are efficient and which can be adjusted to meet the precise requirements of the conditions existing in the room at the time the mirror is being used whereby the exact amount of heated air which is heated to the precise temperature necessary is used.

It is another object of the present invention is to provide a bathroom mirror that has anti-fogging capabilities which are efficient and which can be adjusted to meet the precise requirements of the conditions existing in the room at the time the mirror is being used whereby the exact amount of heated air which is heated to the precise temperature necessary is used on the exact locations most effective in removing and preventing fog buildup on that mirror.

SUMMARY OF THE INVENTION

These, and other, objects are achieved by a mirror assembly that includes an air flow assembly that has means for adjusting and directing the air flow onto the mirror as well as an air heating assembly that co-operates with the air flow assembly for heating the air that is directed onto the mirror in accordance with the conditions existing in the room and in accordance with the amount of air being directed against the mirror.

The air flow assembly includes a wall that is moved to permit more or less air to flow into a plenum, and the heating assembly includes a plurality of heating elements that are activated to heat the air as it moves into the plenum. The heating assembly includes a temperature sensor and a humidity sensor that control the heating elements in accordance with the temperature and humidity of the room as well as in accordance with the mass flow of the air flowing from the air flow assembly. The air is directed to flow across the mirror in a manner which makes efficient use of that air flow.

In this manner, the air is used and directed efficiently and is heated only as necessary to meet the conditions of the room adjacent to the mirror. The amount of heating can be adjusted manually or automatically, and thus efficient use of energy is made.

BRIEF DESCRIPTION OF THE DRAWING FIGURES

DETAILED DESCRIPTION OF THE PREFERRED EMBODIMENT OF THE INVENTION

Figure 1:
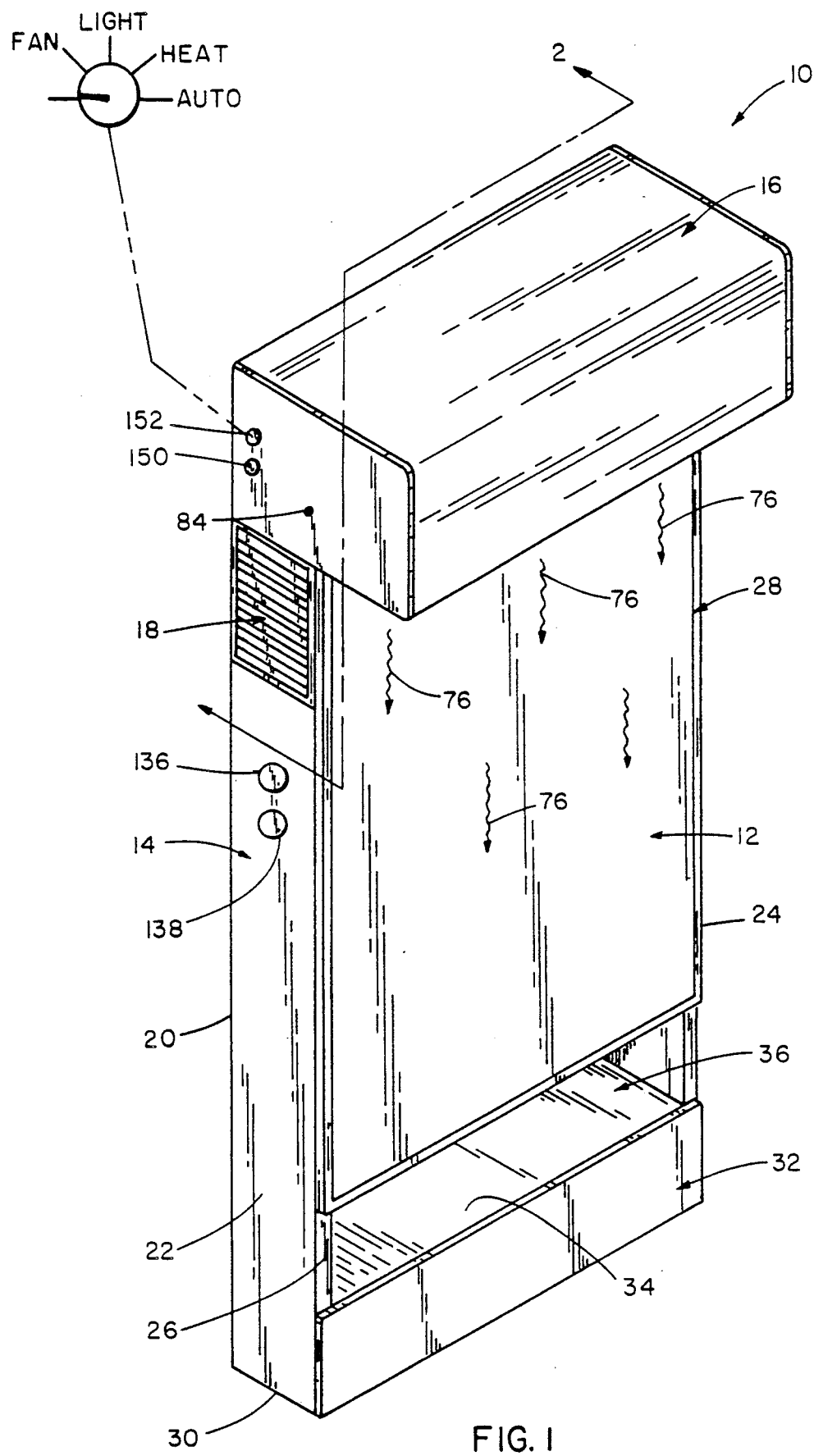
FIG. 1 is a perspective view of the bathroom mirror unit embodying the present invention.

Shown in FIG. 1 is a mirror unit 10 having a main mirror 12 and which is suitable for use in a bathroom or other such room where it will be exposed to moist air that is likely to contain water vapor that can condense onto the main mirror to fog that mirror to an extent that it will be difficult to use. While the mirror unit 10 will be disclosed as being suitable for use in a bathroom, it is understood that this is for the sake of convenience, and a limitation to use in a bathroom is not intended.

By way of introduction, it is noted that the unit 10 includes a case 14 on which the main mirror is mounted, an air flow assembly mounted beneath a hood 16 and including an air intake vent 18, an air heating assembly also mounted beneath the hood and which co-operates with the air flow assembly, a light assembly also mounted beneath the hood, and controls on the case for selecting the mode of operation of the unit 10. These main assemblies include further elements and co-operate with each other to heat and direct the air in a manner that makes efficient use of energy and efficiently defogs the mirror 12. Each of these main assemblies will be discussed below.

The case 14 includes a rear wall 20 that is adapted to be mounted on a wall and thus includes the usual wall-mounting elements, such as anchors, hooking holes and the like. The rear wall is preferably rectangular and planar. First and second side walls 22 and 24 are mounted on the rear wall to extend forwardly of that rear wall. For the sake of this disclosure, forward and rear directions will be taken with respect to the wall on which the rear wall 20 is mounted being the rearwardmost location of the unit with the main mirror 12 being mounted forwardly of that rear wall. The side walls include forwardmost edges 26 and 28 that are coplanar with each other, and the main mirror is mounted on these co-planar edges by a hinge means (not shown) on the side wall 24 and a locking element (not shown) on the side wall 22 to open and close to expose shelves (not shown) and other such storage space inside the unit.

The case further includes a bottom wall 30 that is connected to the rear wall and extends forwardly thereof, and a bottom mirror 32 mounted on the bottom and side walls. A shelf 34 is mounted on the rear and side walls to define a lower storage compartment 36 adjacent to the bottom mirror.

Figure 2:
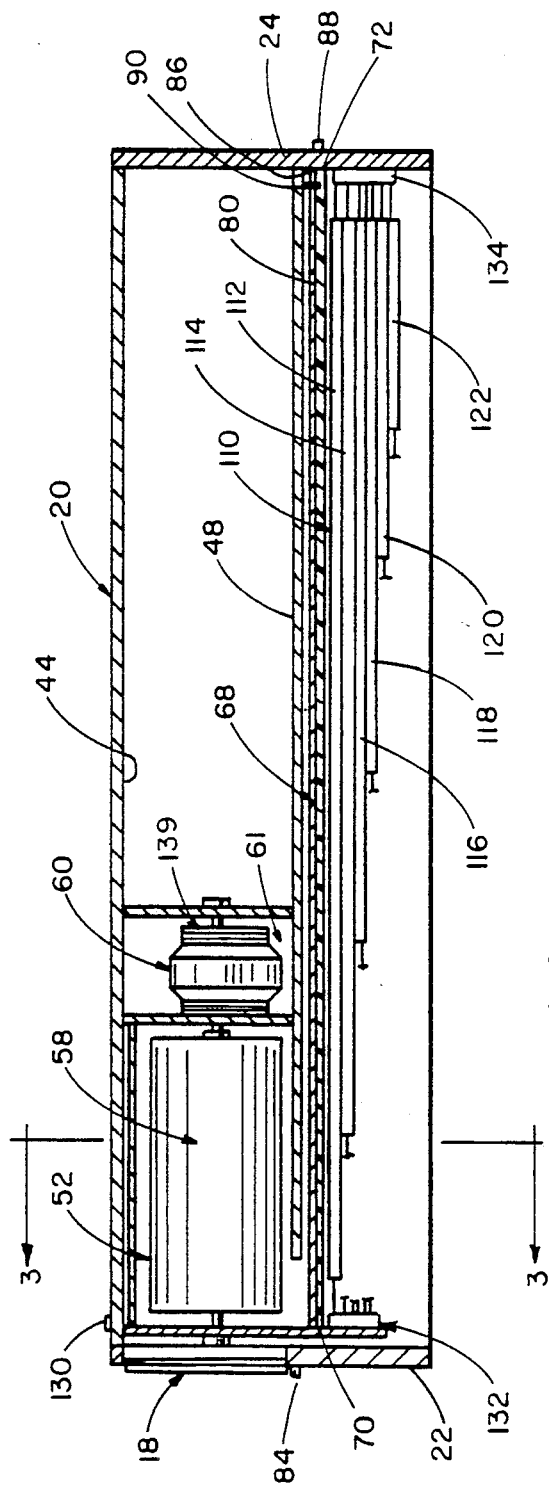
FIG. 2 is a top plan view taken along line 2—2 of FIG. 1 showing the air flow assembly and the heating assembly.
Figure 3:
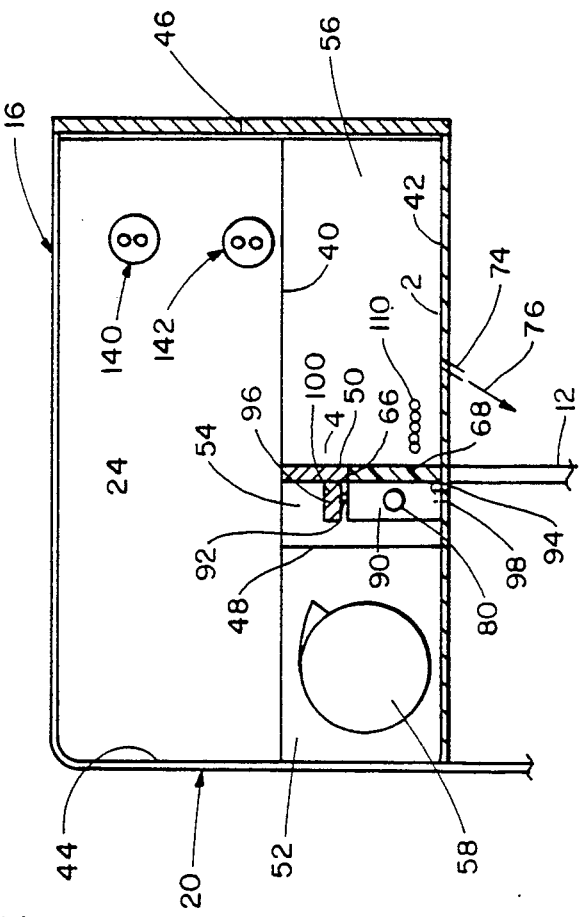
FIG. 3 is an elevational view taken along line 3—3 of FIG. 2 showing the air flow fan, the plenum and a holding chamber.
Figure 4:
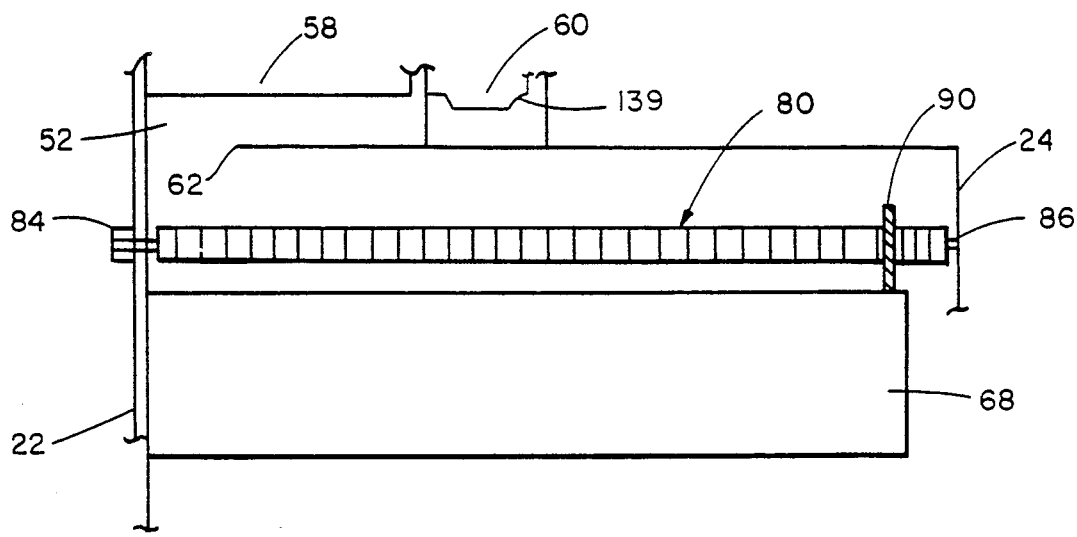
FIG. 4 illustrates a top view of a flexible wall and a flexible wall moving means of the present invention.
Figure 5:
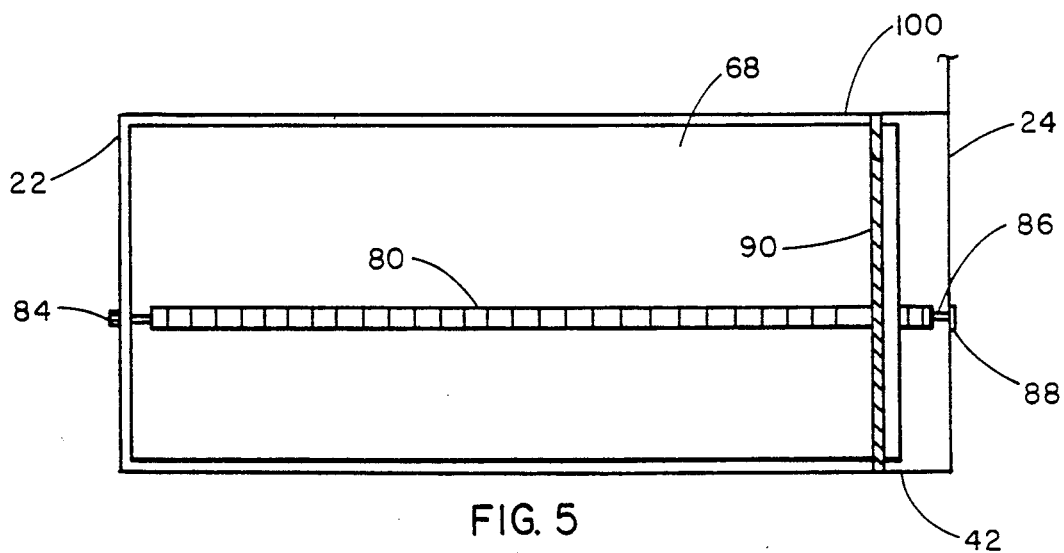
FIG. 5 illustrates a rear elevational view of the flexible wall and flexible wall moving means.

Referring to FIGS. 2 and 3, it is seen that the case further includes first and second divider walls 40 and 42 that are parallel with each other and which extend forwardly of the rear wall inner surface 44 and which extend across the width dimension of the case as defined by the side walls 22 and 24. The divider walls extend forwardly of the main mirror 12 and the second wall 42 forms the bottom of the hood 16 so that the divider walls extend across the entire thickness of the hood as defined by the dimension thereof extending from the rear wall 20 to a forward wall 46 of the hood. The case further includes third and fourth divider walls 48 and 50 respectively that are oriented to be perpendicular to the first and second divider walls and which are spaced apart from each other and which extend across the width dimension of the case from first side wall 22 to the second side wall 24.

The divider walls define a fan compartment 52, an air holding chamber 54, and a plenum 56. Ambient air is drawn into the fan compartment via the intake 18 by a fan 58 that is driven by a motor 60 located in a motor compartment 61 and is forced into the air holding chamber 54 via an air flow exit opening 62 defined in the third divider wall 48 to fluidically connect the fan compartment to the air holding chamber.

The fourth divider wall 50 has a lower edge 66 that is spaced from the second divider wall 42 to define a gap between the second and fourth divider walls. This gap is closed by a flexible wall 68. The flexible wall is impervious to air, and is formed of material, such as rubber or plastic, or the like, that can be exposed to heat and will not degrade yet can be collapsed in an accordion-like manner in the nature of a shower curtain. The flexible wall is attached at a proximal end 70 to the first side wall 22 and extends essentially completely across the width dimension of the case to have a distal end 72 in abutting, non-fixed contact with the second side wall 24 when fully extended as shown in FIG. 2. During collapsing, the wall moves from right to left as viewed in FIG. 2. Thus, air from the fan 58 moves from left to right in that figure to move from the air holding chamber defined by the divider walls in cooperation with the flexible wall into the plenum via the opening left by the movement of flexible wall between the second and fourth divider walls.

Figure 6:
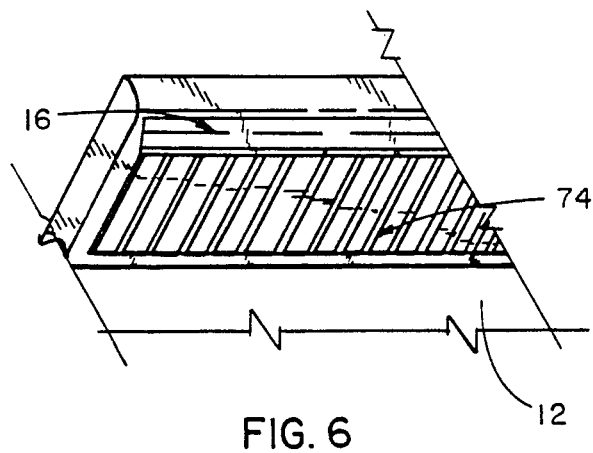
FIG. 6 is a partial perspective of a louver system used to direct air onto a mirror.

The air flowing into the plenum is directed against the mirror by louver-like conduits, such as conduit 74 shown in FIGS. 3 and 6. The air flow is indicated in FIGS. 1 and 3 by the arrows 76.

The flexible wall is opened by a wall moving means that includes a screw 80 attached at a proximal end thereof to the first side wall 22 and extending across the entire width dimension of the case to a distal end located adjacent to the second side wall 24. The screw 80 includes a screw thread and a knob 84 located outside of the case and connected to the proximal end of the screw to manually operate that screw by rotating such screw about the longitudinal axis thereof either clockwise or counterclockwise. The distal end of the screw is mounted in a step bearing 86 on the second side wall and is connected to a rotation counter 88 for determining the location of the flexible wall with respect to the first and second side walls for a purpose to be discussed below. The screw is thus supported at both ends for rotation about its longitudinal centerline.

The screw is attached to the flexible wall to move that wall by a nut-like element 90 that has a bore defined therethrough and is threaded internally of such bore to co-operatively engage the screw thread to be moved as the screw is rotated. The element 90 has top and bottom keys 92 and 94 respectively that engage top and bottom keyway slots 96 and 98 respectively defined in a bulkhead element 100 affixed to the fourth divider wall superadjacent to the lower edge 66 of that wall and in the second divider wall 42. The element 90 is attached to the flexible wall along essentially the entire height of that wall as defined between the edge 66 of the fourth wall and the second divider wall 42 and thus moves that wall as it moves under the control of the screw 80. The element 90 also supports the flexible wall since that element is supported by the bulkhead 100 and the second divider wall 42 via the keyway slots.

Since the screw 80 is fixed and since the element 90 is fixed against rotation, rotation of the screw, as by means of the knob 84, will cause the element 90 to move left or right as viewed in FIG. 2 to move the flexible wall distal end away from or towards the second side wall 24 to open or to close the gap between the air holding chamber 54 and the plenum 56. The more the flexible wall is moved towards the first side wall 22, the greater the opening and the more air that is permitted to flow into the plenum. It is noted that since air is a compressible fluid, even if the flexible wall is totally closed thereby totally closing the plenum with respect to the air holding chamber 54, the overall operation of the fan will not be significantly affected as air will simply be compressed in the fan chamber and in the air holding chamber.

The air heating assembly is best indicated in FIG. 2 by the reference numeral 110 and includes a plurality of resistance-type heater elements 112, 114, 116, 118, 120 and 122 each mounted on the second divider wall and the side walls to extend across the width dimension of the case adjacent to the flexible wall and in the plenum whereby air from the air holding chamber 54 passes over these heating elements as it flows into the plenum.

As can be seen in FIG. 2, the heating elements vary in length dimension from the longest element 112 which extends for essentially the entire width dimension of the case, to the shortest element 120 that extends for approximately one-eighth of that width dimension. As can also be seen, the air passing out of the air holding chamber 54 passes succeedingly fewer heating elements as the flexible wall is opened further.

Figure 7:
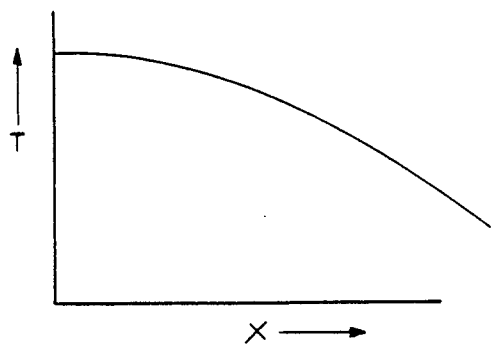
FIG. 7 is a plot of temperature versus position illustrating the temperature of the air being directed against the mirror as a function of widthwise distance on the mirror unit.
Figure 8:
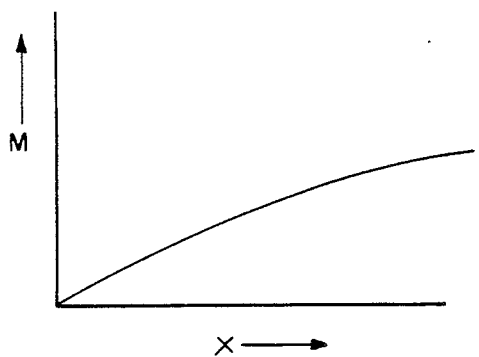
FIG. 8 is a plot of mass flow versus position illustrating the mass flow rate of the air being directed against the mirror as a function of widthwise distance on the mirror unit.

This feature is indicated graphically in FIGS. 7 and 8, and permits the air temperature to be controlled so that the hottest air will flow from the upper corner of the hood while the maximum air flow will be achieved with the most energy being added to the air as it moves downwardly over the mirror. The inverse relationship shown in FIGS. 7 and 8, permits greater control to be exercised over the temperature and mass flow of the air being directed against the mirror.

Figure 9:
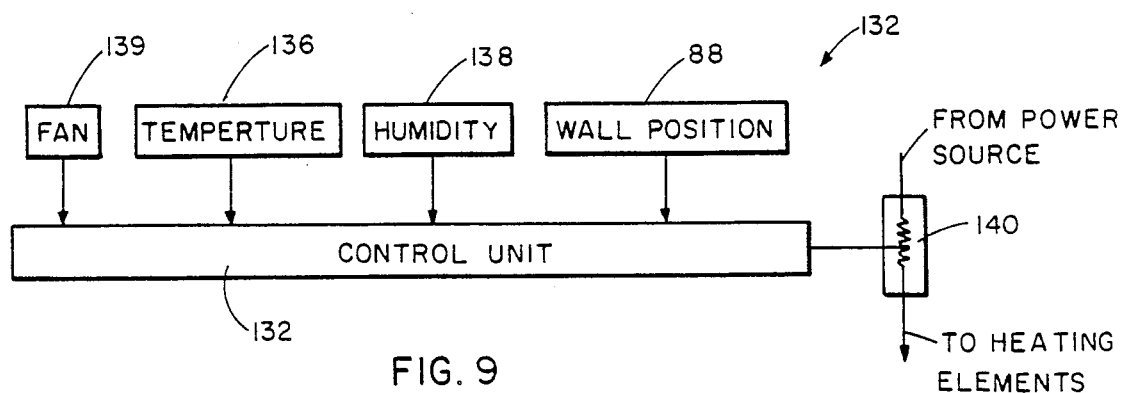
FIG. 9 is a block diagram illustrating the control system used to control the air heating assembly of the mirror unit of the present invention.

The heating elements are connected to a source of power, such as utility power, via a plug 130 mounted on the rear wall so that no cords are located externally of the unit. This power is supplied to the heating elements via a control system indicated in FIG. 2 at 132, and shown in block diagram form in FIG. 9. The heating elements are connected to a ground by a connection 134, and to the source of power via the control system 132 to be activated according to the temperature in the room as sensed by a temperature sensing element 136 mounted on the first side wall 22 to be adjacent to the main mirror, according to the humidity of the room adjacent to the main mirror as sensed by a humidity sensor element 138 mounted on the first side wall 22, and according to the position of the flexible wall with respect to the second side wall 24 as determined by the screw rotation counter 88. The fan motor 60 also includes a speed sensor 139 which generates a signal corresponding to the speed of the fan so that the control unit 132 can factor fan speed into the control of the heating elements.

Signals from these sensors 88, 136, 138 and 139 are sent to the control system 132 which adjusts the amount of power applied to the heating elements via an adjustment element 140. The control unit 132 can be a microprocessor or the like or a summing element as discussed in standard textbooks such as "Microelectronic Circuits" by A. S. Sedra and K. C. Smith and published by Holt, Rinehart and Winston in 1982 and in standard handbooks such as "Handbook of Modern Electronics and Electrical Engineering" edited by C. Brelove and published by John Wiley & Sons in 1986, the disclosures of which are fully incorporated herein by reference.

The unit also includes two fluorescent lights 141 and 142 which are connected to the power source and which are mounted in the hood to direct light onto the mirror and upwardly from the case via the hood which is translucent adjacent to the lights 141 and 142.

As shown in FIG. 1, the unit also includes an on/off switch 150 and a selector switch 152 that connect the power source to the control unit 132. As shown in FIG. 1, the selector switch can be moved to select fan-only operation, light-only operation, heat-only operation, or automatic operation in which the control unit 132 is used to control the heat output of the heater elements according to the above-described functional relationships.

It is understood that while certain forms of the present invention have been illustrated and described herein, it is not to be limited to the specific forms or arrangements of parts described and shown.

I claim:
1. A bathroom cabinet comprising:
A) a case unit which includes
   (1) a planar rear wall having a rear surface located to be mounted on a support structure, such as a wall,
   (2) first and second side walls mounted on said rear wall and extending forwardly therefrom and each having a front edge spaced from said rear wall, said case having a width dimension defined between said first and second side walls and a thickness dimension defined between said rear wall and said side wall front edges,
   (3) a bottom wall mounted on said rear wall and extending forwardly thereof,
   (4) a bottom mirror attached to said bottom wall and to said first and second side walls,
   (5) a shelf attached to said first and second side walls,
   (6) a main mirror attached to said first and second side wall front edges,
   (7) a hood attached to said rear wall and to said first and second side walls and located on top of said case unit and extending in front of said main mirror and having a lower wall located adjacent to said main mirror, said lower wall having a forward wall and a plurality of conduits defined therethrough and directed towards said main mirror,
   (8) a plurality of divider walls including
      (a) first and second divider walls attached to said rear wall and to said hood forward wall and extending across the width dimension of said case, said first and second divider walls being parallel and spaced from each other,
      (b) a third divider wall attached to said first and second divider walls and extending perpendicular to said first and second divider walls and having an air flow exit opening defined therethrough, and
      (c) a fourth divider wall attached to said first divider wall and extending perpendicular to said first divider wall toward said second divider wall, said fourth divider wall having a lower edge which is spaced from said second divider wall to define a gap between said second and said fourth divider walls,
  (9) a plurality of chambers defined in said case by said divider walls including
    (a) a fan compartment defined by said first, second and third divider walls,
    (b) an air holding chamber defined by said first, second, third and fourth divider walls, said air holding chamber being fluidically connected to said fan compartment by said air flow exit opening, and
    (c) a plenum defined by said second side wall, and said first, second and fourth divider walls, said plenum being fluidically connected to said air holding chamber by said gap,
  (10) an air inlet defined through said first side wall and fluidically connected to said fan compartment,
  (11) a flexible wall attached to said first side wall and located in said gap between said second and fourth divider walls, said flexible wall having a proximal end attached to said first side wall and a distal end, and being movable mounted to move between a first position completely closing said gap and a second position uncovering said gap, and
  (12) a flexible wall moving means connected to said flexible wall, said flexible wall moving means including a flexible wall position sensor which generates a wall position signal corresponding to the position of said flexible wall relative to said first and second side walls;
B) an air flow assembly which includes
  (1) a fan mounted in said fan compartment, said fan being fluidically connected to said air intake to receive ambient air,
  (2) a selector switch mounted on said first side wall,
  (3) a fan motor connected to said fan and to a source of power via said selector switch, and
  (4) a fan output sensor mounted on said fan motor and generating a fan output signal corresponding to the output of said fan;
C) an air heating assembly which includes
  (1) a plurality of heating elements mounted on said case side walls and connected to a source of power via said selector switch, each heating element having a length that differs from the length of adjacent heating elements, with a longest heating element of said plurality of heating elements being located adjacent to said gap,
  (2) a control unit mounted in said case and connecting said heating elements to the source of power, said control unit including
    (a) a temperature sensor mounted on said first side wall and generating a temperature signal corresponding to the temperature adjacent to said main mirror,
    (b) a humidity sensor mounted on said first side wall and generating a humidity signal corresponding to the relative humidity adjacent to said main mirror,
    (c) control circuit means,
    (d) fan output signal receiving means connected to said circuit means,
    (e) temperature signal receiving means connected to said circuit means,
    (f) humidity signal receiving means connected to said circuit means,
    (g) flexible wall position signal receiving means connected to said circuit means,
    (h) a circuit element connecting said control circuit means to said heating elements and controlling the amount of power supplied to said heating elements to be a function of said temperature signal, said fan output signal, said flexible wall position signal, and said humidity signal; and
D) a light assembly mounted in said hood and including
  (1) a fluorescent light; and
  (2) means connecting said fluorescent light to said selector switch.

2. The bathroom cabinet defined in claim 1 wherein said flexible wall moving means includes
  (a) a screw mounted on said first side wall,
  (b) a nut-like element threadably mounted on said screw,
  (c) a top key mounted on said nut-like element,
  (d) a bottom key mounted on said nut-like element,
  (e) a bulkhead mounted on said fourth divider wall adjacent to said gap,
  (f) a top keyway slot defined in said bulkhead and slidably receiving said top key and extending essentially entirely across the width dimension of said case,
  (g) a bottom keyway slot defined in said second divider wall beneath said top keyway slot and slidably receiving said bottom key and extending essentially entirely across the width dimension of said case, and
  (h) a knob on said screw for rotating said screw.

3. The bathroom cabinet defined in claim 2 further including a second fluorescent light adjacent to said first fluorescent light.

4. The bathroom cabinet defined in claim 3 wherein said flexible wall position sensor includes a means for counting the number of rotations of said screw.

5. The bathroom cabinet defined in claim 4 wherein said longest heating element extends essentially entirely across the width dimension of said case, and a shortest heating element of said plurality of heating elements is located adjacent to said second wall.

6. The bathroom cabinet defined in claim 5 wherein said shortest heating element extends for approximately one-eighth of the case width dimension.

7. The bathroom cabinet defined in claim 6 wherein said flexible wall distal end is located adjacent to said second side wall when said flexible wall is in said second position.

8. The bathroom cabinet defined in claim 7 wherein said shortest heating element is located adjacent to said second side wall.

9. The bathroom cabinet defined in claim 8 wherein the remaining heating elements of said plurality of heating elements are positioned between said longest and said shortest heating elements.

* * * * *